United States Patent
Kapur et al.

(10) Patent No.: US 9,246,905 B2
(45) Date of Patent: *Jan. 26, 2016

(54) AUTHENTICATION WITHIN OPENFLOW NETWORK

(71) Applicant: International Business Machines Corporation, Armonk, NY (US)

(72) Inventors: Ashish Kapur, Santa Clara, CA (US); Vishal Shukla, Santa Clara, CA (US); Thu Quoc Tran, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,381

(22) Filed: Jan. 5, 2015

(65) Prior Publication Data

US 2015/0113612 A1    Apr. 23, 2015

Related U.S. Application Data (63) Continuation of application No. 13/751,099, filed on Jan. 27, 2013, now Pat. No. 8,966,586.

(51) Int. Cl.
*H04L 29/06* (2006.01)
*H04L 9/32* (2006.01)
*H04L 12/771* (2013.01)

(52) U.S. Cl.
CPC .............. *H04L 63/08* (2013.01); *H04L 9/3276* (2013.01); *H04L 45/56* (2013.01); *H04L 63/00* (2013.01); *H04L 63/083* (2013.01); *H04L 63/104* (2013.01)

(58) Field of Classification Search
CPC ....... H04L 63/10; H04L 63/08; H04L 63/101; H04L 67/10; H04W 12/08
See application file for complete search history.

(56) References Cited

U.S. PATENT DOCUMENTS

| | | | | |
|---|---|---|---|---|
| 8,811,399 B2* | 8/2014 | Berman | ............... | H04L 12/4625 370/392 |
| 8,817,620 B2* | 8/2014 | Koponen | ............ | H04L 12/4633 370/235 |
| 8,817,621 B2* | 8/2014 | Casado | ............... | H04L 12/4633 370/235 |
| 8,819,211 B2* | 8/2014 | Barabash | ............ | H04L 41/0893 709/223 |
| 8,830,820 B2* | 9/2014 | Mandal | ................... | H04L 45/64 370/217 |
| 8,830,823 B2* | 9/2014 | Koponen | ............ | H04L 12/4633 370/219 |
| 8,837,272 B2* | 9/2014 | Wu | ....................... | H04B 7/0697 370/208 |
| 8,837,493 B2* | 9/2014 | Casado | ............... | H04L 12/4633 370/395.53 |
| 8,842,679 B2* | 9/2014 | Koponen | ............ | H04L 12/4633 370/396 |
| 8,842,988 B2* | 9/2014 | Spock | ..................... | H04L 14/00 398/45 |

(Continued)

OTHER PUBLICATIONS

"OpenFlow Switch Specification", Sep. 6, 2012.*

(Continued)

*Primary Examiner* — Yonas Bayou
(74) *Attorney, Agent, or Firm* — Mark Vallone (57) ABSTRACT

An OpenFlow network controller controls an OpenFlow network. A networking connection is established between the OpenFlow network controller and an OpenFlow network device attempting to become part of the OpenFlow network. After establishing the networking connection with the OpenFlow network device, the OpenFlow network controller attempts to authenticate the OpenFlow network device. Where authentication of the OpenFlow network device is successful, the OpenFlow network controller sends a message to the OpenFlow network device to indicate that the authentication was successful and permits the OpenFlow network device to join and perform OpenFlow messaging.

6 Claims, 4 Drawing Sheets

(56) References Cited

U.S. PATENT DOCUMENTS

| | | |
|---|---|---|
| 8,966,586 B2 | 2/2015 | Shukla et al. |
| 2009/0138577 A1* | 5/2009 | Casado .................. H04L 41/06 709/220 |
| 2013/0060929 A1* | 3/2013 | Koponen ............ H04L 12/4633 709/224 |
| 2014/0211661 A1* | 7/2014 | Gorkemli ................ H04L 45/64 370/255 |
| 2014/0215556 A1 | 7/2014 | Shukla et al. |

OTHER PUBLICATIONS

Non-final office action for U.S. Appl. No. 13/751,099 dated Jun. 27, 2014, 20 pp.

Notice of allowance for U.S. Appl. No. 13/751,099 dated Jun. 27, 2014, 9 pp.

* cited by examiner

AUTHENTICATION WITHIN OPENFLOW NETWORK

BACKGROUND

Network fabrics include devices that are interconnected to one another through a web of various switching devices like routers, hubs, switches, and so on. The network fabrics permit the devices to be interconnected for a variety of different purposes. For instance, the devices may be interconnected to implement a local-area network or a wide-area network for data transmission purposes, to implement a storage-area network, to achieve clustering, and so on.

SUMMARY

An example method includes establishing, between an OpenFlow network controller with an OpenFlow network device attempting to become part of an OpenFlow network that the OpenFlow network controller controls, a networking connection. The method includes, after the networking connection has been established between the OpenFlow network controller and the OpenFlow network device, attempting to authenticate the OpenFlow network device, by the OpenFlow network controller. The method includes, where authentication of the OpenFlow network device is successful, sending a message to the OpenFlow network device to indicate that the authentication was successful and permitting the OpenFlow network device to perform OpenFlow messaging with the OpenFlow network controller.

An example computer program product includes a computer-readable data storage medium storing computer-executable code executable by an OpenFlow network controller to perform a method. The method includes establishing, with an OpenFlow network device attempting to become part of an OpenFlow network that the OpenFlow network controller controls, a networking connection. The method includes, after the networking connection has been established with the OpenFlow network device, sending a first authentication message to the OpenFlow network device. The first authentication message specifies a first hash algorithm. The method includes, where the OpenFlow network controller receives a first authentication response from the OpenFlow network device sent in reply to the first authentication message and specifying a second hash algorithm, and where the first hash algorithm and the second hash algorithm are identical, sending a second authentication message to the OpenFlow network device. The second authentication message specifies a challenge value. The method includes, where the OpenFlow network controller receives a second authentication response from the OpenFlow network device sent in reply and specifying a challenge response, and where the challenge response is correct, sending a message to the device to indicate that the authentication was successful and permitting the device to perform OpenFlow messaging.

An example OpenFlow network controller includes hardware, including at least a processing mechanism, as well as OpenFlow authentication logic implemented at least by the hardware. The OpenFlow authentication logic is to perform authentication of an OpenFlow network device attempting to become part of an OpenFlow network controlled by the OpenFlow network controller, based on a predetermined hash algorithm, after a networking connection has been established between the OpenFlow network controller and the OpenFlow network device. In a first case, the OpenFlow authentication logic determines that the OpenFlow network device supports an authentication process using the predetermined hash algorithm, and accordingly permits the device to join the OpenFlow network depending on whether the device successfully answers a challenge posited by the logic. In a second case, the OpenFlow authentication logic determines that the OpenFlow network device supports the authentication process using a different hash algorithm, and accordingly does not permit the OpenFlow network device to join the OpenFlow network. In a third case, the OpenFlow authentication logic determines that the OpenFlow network device does not support the authentication process, and accordingly permits the OpenFlow network device to join the OpenFlow network depending on whether backward compatibility is permitted.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a network fabric, which can be referred to as a network, includes devices that are interconnected to one another through a web of various switching devices like routers, hubs, switches, and so on. As such, the devices can communicate with one another by transmitting data through the network fabric or network, and more specifically via the switching devices routing the data among the devices. The switching devices may more generally be referred to as network devices. Different switching devices are compatible with different protocols.

For example, a traditional protocol that provides for communication among switching devices of a network fabric is a protocol for an open systems interconnection (OSI) model layer, such as what is known as a layer-two protocol. Examples of layer-two protocols include the transparent interconnection of lots of links (TRILL) layer-two protocol, and the shortest-path bridging (SPB) layer-two protocol. The TRILL layer-two protocol is maintained by the Internet Engineering Task Force (IETF), which is an organized activity of the Internet Society (ISOC) based in Reston, Va. The SPB layer-two protocol is maintained as the 802.11aq standard by the Institute of Electrical and Electronics Engineers (IEEE) based in Washington, D.C.

More recently, software-defined networking (SDN) protocols have been adopted. An SDN protocol differs in at least one respect from a more traditional protocol in that the switching devices can be relatively low cost and so-called "dumb" switching devices that do not have much if any built-in routing logic. Instead, the switching devices are programmed and controlled by an external network fabric controller device over a programming path different than the data path and/or the control path of the network. An example of an SDN protocol is the OpenFlow protocol maintained by the Open Networking Foundation of Palo Alto, Calif., such that a corresponding network fabric controller device is referred to as an OpenFlow network controller. Switching and other network devices are likewise referred to as OpenFlow network devices.

A disadvantage of the OpenFlow protocol in particular is that any OpenFlow network device can join an OpenFlow network. This is problematic, because malicious such devices may easily join existing OpenFlow networks by communicating with the OpenFlow network controllers controlling these OpenFlow networks. The OpenFlow protocol does not provide for any mechanism by which unknown and/or untrusted OpenFlow network devices cannot become part of an OpenFlow network. By comparison, disclosed herein are techniques by which OpenFlow network devices can be authenticated before they are permitted to join an OpenFlow network and thus before these devices can perform OpenFlow messaging.

Figure 1:
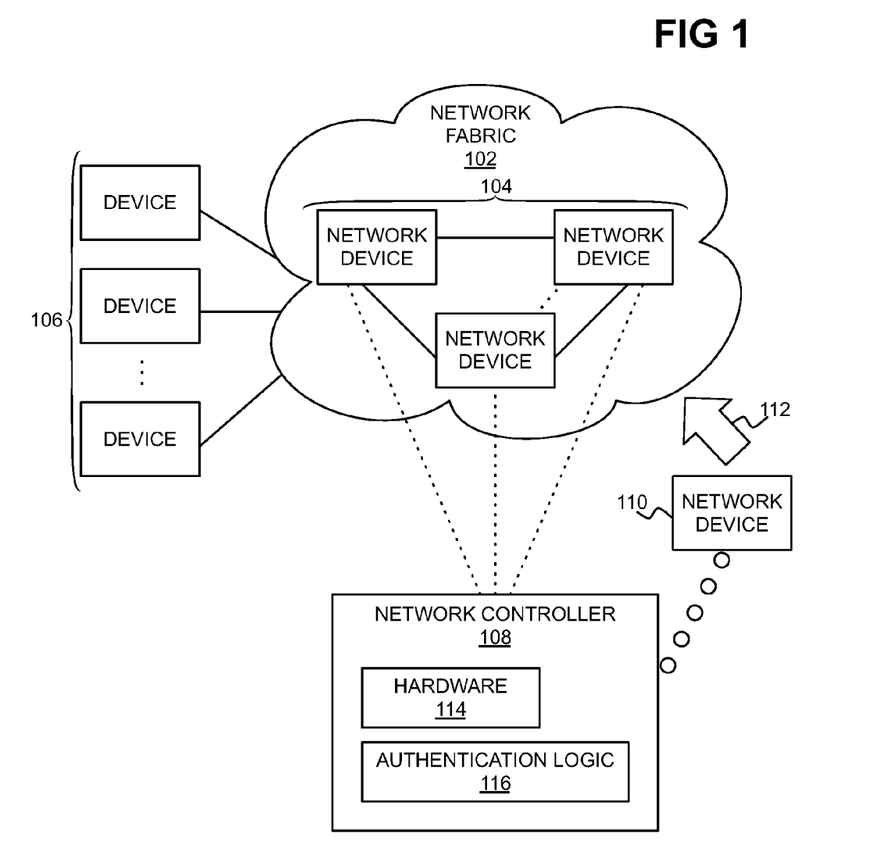
FIG. 1 is a diagram of an example OpenFlow network in which authentication can be performed.

FIG. 1 shows an example OpenFlow network 102, which is a type of network fabric. The OpenFlow network 102 can implement a storage-area network, a local-area or a wide-area network for data transmission purposes, a network to achieve clustering, or another type of network. The OpenFlow network 102 includes network devices 104, such as switching devices and forwarder devices in the parlance of the OpenFlow protocol. Examples of network devices 104 include routers, hub, and switches, among other types of network devices. The network devices 104 are OpenFlow network devices because they adhere to the OpenFlow protocol.

The OpenFlow network 102 permits the devices 106 to communicate with one another. In the parlance of the OpenFlow protocol, the devices 106 are nodes that can include target nodes and initiator nodes that initiate communication with the target nodes. The devices 106 can be logical, virtual, physical, and/or discrete devices, such as computing devices like servers, client computers, other types of client computing devices, server computers, other types of server computing devices, storage devices, and so on, that initiate and receive data requests. The network devices 104 route data among the devices 106 over the OpenFlow network 102.

The network controller 108 is a device which controls the OpenFlow network 102 but which is not technically a part of the network 102. The network controller 108 is an OpenFlow network controller because it adheres to the OpenFlow protocol. The network devices 104 have hardware to provide for routing of data among the devices 106, but how the network devices 104 perform this routing is controlled by software thereof that is programmable by the network controller 108. The network controller 108 by comparison does not route data among the devices 106, but rather programs the software of the network devices 104 for the devices 104 to perform this routing.

The network devices 104, the devices 106, and the network controller 108 are communicatively interconnected as indicated in FIG. 1 by three types of lines: solid lines, dashed lines, and dotted lines. The solid lines represent transmission of data over data paths or channels. The dotted lines represent transmission of programming information over programming paths or channels, and transmission of control information over control paths or channels.

The data is the actual data that the devices 106 communicate with one another using the OpenFlow network 102 and that the network devices 104 route within and over the OpenFlow network 102. The control information can include port information, address information, and other types of control information regarding the network devices 104 themselves. The control information can include, or can be used to determine, how the components of the OpenFlow network 102 are interconnected to one another, for instance.

The programming information includes routing tables and/or other types of programming logic. As such, the network controller 108 can effectively control how the network devices 104 route data through the OpenFlow network 102 among the devices 106. The network controller 108 receives control information from the network devices 104 over a control path or channel.

In FIG. 1, a network device 110 is attempting to join the OpenFlow network 102 to become another of the network devices 104, as indicated by the arrow 112. The network device 110 is an OpenFlow network device because it adheres to the OpenFlow protocol, even though it has not yet joined the OpenFlow network 102 in particular. A networking connection is established between the network controller 108 that controls the OpenFlow network 102 and the network device 110, which is indicated in FIG. 1 by a line of hollow circles.

The network controller 108 then authenticates the network device 110. If authentication is successful, the network controller 108 permits the network device 110 to join the OpenFlow network 102 and thus to perform OpenFlow messaging with the controller 108. OpenFlow messaging is the transmission and receipt of messages, such as including control information, in accordance with the OpenFlow protocol. If authentication is unsuccessful, the network controller 108 may prohibit the network device 110 from joining the OpenFlow network 102 and thus from performing OpenFlow messaging, and indeed may disconnect or terminate the previously established networking connection with the network device 110.

The network controller 108 includes hardware 114, such as including a processing mechanism like a processor. For instance, the authentication logic 116 may be computer-executable code that is executed by the processor. As another example, the authentication logic 116 may be logic implemented via the hardware 114 insofar as this hardware 114 includes an application-specific integrated circuit (ASIC) or a field-programmable gate array (FPGA) in which this logic is coded. In one implementation, the OpenFlow authentication logic 116 performs authentication of the network device 110, after a networking connection has been established therewith, in accordance with three different cases. First, if the authentication logic 116 determines that the network device 110 supports an authentication process using a predetermined hash algorithm, the logic 116 accordingly permits the network device 110 to join the OpenFlow network 102 depending on whether the network device 110 successfully answers a challenge posited by the logic 116. Second, if the authentication logic 116 determines that the network device 110 supports the authentication process using a different hash algorithm, the logic 116 accordingly does not permit the network device 110 to join the OpenFlow network 102.

Figure 3A:
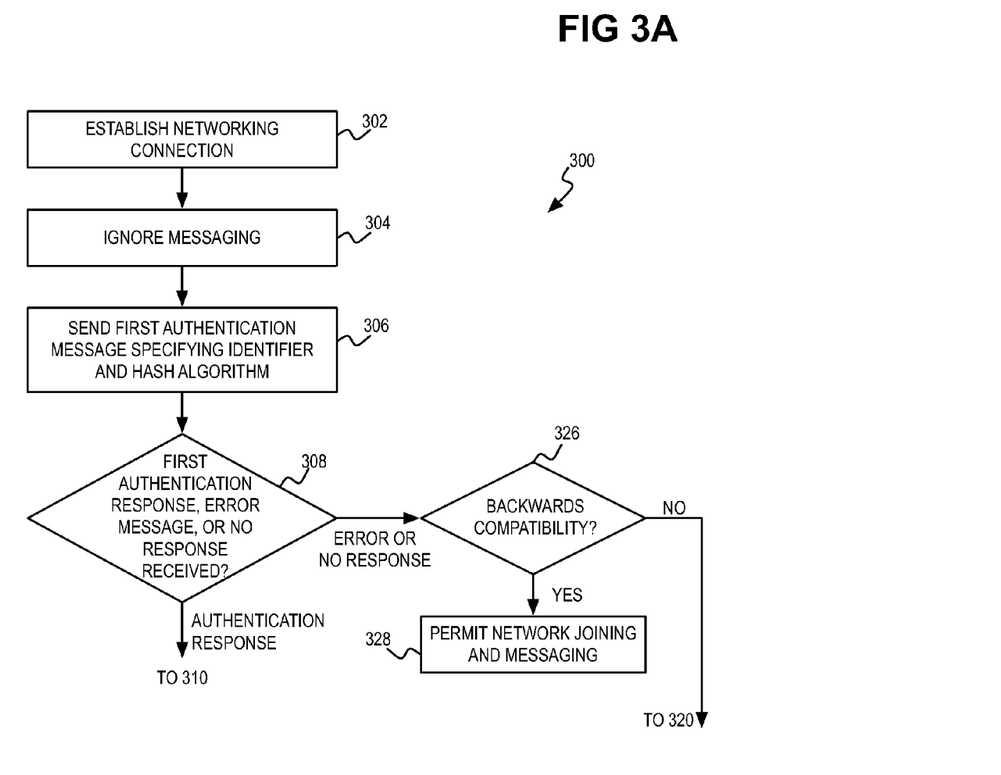
FIGS. 3A and 3B are flowcharts of an example method by which authentication is performed within an OpenFlow network, and which is more detailed than but consistent with the method of FIG. 2.
Figure 3B:
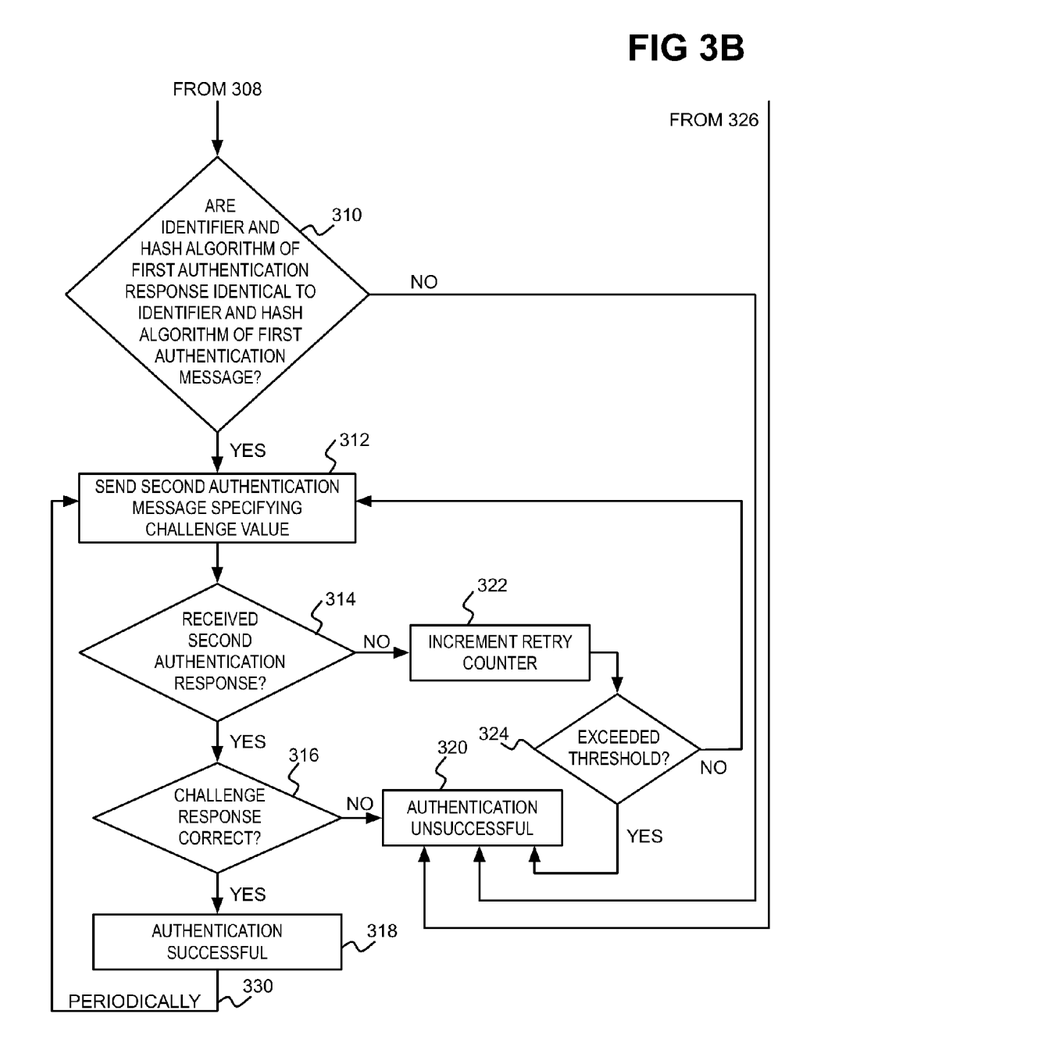

Third, if the OpenFlow authentication logic 116 determines that the network device 110 does not support the authentication process, the authentication logic 116 accordingly permits the network device 110 to nevertheless join the OpenFlow network 102 depending on whether backward compatibility is permitted. For greater security, if the network device 110 does not support the authentication process, then the authentication logic 116 does not permit the network device 110 to join the OpenFlow network 102. For greater backward compatibility with network devices that do not support authentication, if the network device 110 does not support the authentication process, then the authentication logic 116 still permits the network device 110 to join the OpenFlow network 102. Each of these first, second, and third cases is described in more detail later in the detailed description by reference to FIG. 3.

Figure 2:
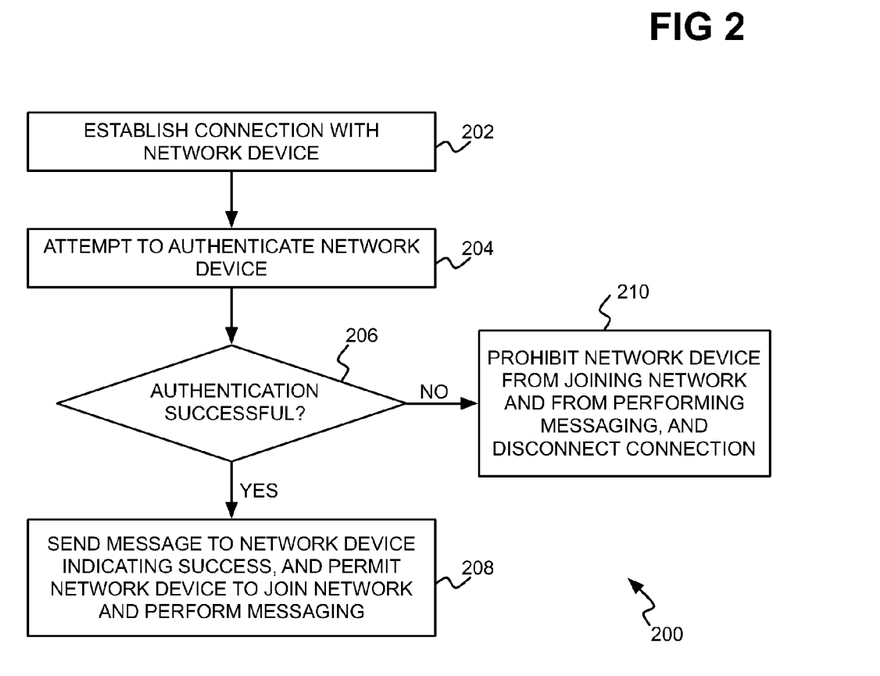
FIG. 2 is a flowchart of an example method by which authentication is performed within an OpenFlow network.

FIG. 2 shows an example method 200 summarizing the authentication process that the network controller 108 can perform in relation to the network device 110 vis-à-vis the OpenFlow network 102. A networking connection is established between the network controller 108 and with the network device 110 outside of the auspices of the OpenFlow protocol (202). For example, the networking connection may be a transmission control protocol/Internet protocol (TCP/IP) networking connection. Once the networking connection has been established, the network controller 108 attempts to authenticate the network device 110 (204). For example, the network controller 108 can employ a challenge handshake authentication protocol (CHAP), such as is described later in the detailed description by reference to FIGS. 3A and 3B.

If the authentication of the network device 110 is successful (206), then the network controller 108 sends a message to the network device 110 indicating that authentication was successful (208). The network controller 108 also then permits the network device 110 to join the OpenFlow network 102, and to perform OpenFlow messaging. By comparison, if authentication is unsuccessful (206), then the network controller 108 prohibits the network device 110 from joining the OpenFlow network 102 and from performing OpenFlow messaging (210). The network controller 108 also then may disconnect or terminate the networking connection that was previously established with the network device 110.

FIGS. 3A and 3B show an example method 300 of the authentication process that the network controller 108 can perform in relation to the network device 110 vis-à-vis the OpenFlow network 102. The method 300 is more detailed than but consistent with the method 200. For instance, parts 306, 308, 310, 312, 314, 316, 318, 320, 322, 324, 326, and 328 can implement part 204 of the method 200 in one implementation.

A networking connection is established between the network controller 108 and the network device 110 as before (302). Thereafter, OpenFlow messages received from the network device 110 are ignored by the network controller 108 until the network controller 108 has finished attempting to authenticate the network device 110 (304). That is, until the network controller 108 has permitted or denied the network device 110 from joining the OpenFlow network 102, OpenFlow messages sent by the network device 110 are ignored by the controller 108 and are not permitted to be sent to other network devices 104 already on and part of the network 102.

The network controller 108 sends a first authentication message to the network device 110 (306). The first authentication message may also be referred to as a configuration message. The first authentication message includes or specifies an identifier that identifies the current authentication session (i.e., the present authentication of the network device 110 by the network controller 108). The identifier is different each time the authentication process is performed beginning at part 306. The first authentication message also identifies the hash algorithm that the network controller 108 uses to authenticate the network device 110. For instance, the hash algorithm may be the MD5 hash algorithm.

The network controller 108 can receive back from the network device 110, in reply to the first authentication message, two different types of responses. The first type of response is an authentication response, which can be referred to as a configuration response. The second type of response is an error message, such as an OpenFlow error message. The network device 110 may also send no response back to the network controller 108 in reply to the first authentication message.

If the network controller 108 receives an authentication or configuration response back from the network device 110 in reply to the first authentication message, which is referred to in FIGS. 3A and 3B as a first authentication response (308), then the network controller 108 examines the identifier and the hash algorithm specified within the first authentication response. The hash algorithm of the first authentication response is the hash algorithm that the network device 110 uses to be authenticated. The identifier identifies the current authentication session (i.e., the present authentication of the network device 110 by the network controller 108). The identifier and the hash algorithm specified within the first authentication response have to be identical to the identifier and the hash algorithm specified within the first authentication message for the network controller 108 to continue with authentication of the network device 110 (310).

As such, if the identifier of the first authentication message is identical to the identifier of the first authentication response, and if the hash algorithm specified within the first authentication message is identical to the hash algorithm specified within the first authentication response (310), the network controller 108 sends a second authentication message to the network device 110 (312). The second authentication message may also be referred to as a challenge message. The second authentication message specifies or includes a challenge value that the network device 110 hashes in accordance with a secret, or password, known to both the network device 110 and the network controller 108, using the hash algorithm.

The challenge value may be a variable stream of octets, where the number of octets in this stream is specified within the second authentication message as well. The challenge value is changed each time the authentication process beginning at part 306 is performed. The length of the challenge value can depend on the approach employed to generate the octets, and is independent of the hash algorithm.

If the network controller 108 receives a second authentication response from the network device 110 in reply to the second authentication message (314), then the network controller 108 inspects the second authentication response. The second authentication response includes a challenge response, which is the hashing of the challenge value in accordance with the secret, or password, known to both the network device 110 and the network controller 108, using the hash algorithm. As such, the network controller 108 knows a priori what the challenge response should be. Ultimately, then, the network controller 108 authenticates the network device 110 on the basis of this challenge response. Even if a nefarious network device attempting to be authenticated were aware of the specific authentication process of the method 300, unless the network device also has knowledge of the secret or password, such a network device would still fail authentication.

Specifically, then, both the network controller 108 and the network device 110 separately generate the challenge response. The network controller 108 compares its generated challenge response to the challenge response that the network device 110 generated and that is included in the second authentication response. The challenge response can be generated as a one-way hash over a stream of octets, using the hash algorithm. This stream of octets may be the identifier of the current authentication session, followed by (i.e., concatenated with) the secret or password, followed by (i.e., concatenated with) the challenge value. Thus, unless the network device 110 knows the secret or password, the challenge response that the device 110 generates will be incorrect (i.e., it will differ from the challenge response that the network controller 108 generates). It is noted that the secret or password is never sent in plaintext between the network device 110 and the network controller 108, but rather is hashed along with the challenge value and the identifier.

If the challenge response is correct (316), then authentication of the network device 110 is successful (318). Thus, the network controller 108 can send a response to the network device 110 indicating that the device 110 has been authenticated, as described in relation to part 208 of the method 200. The network controller 108 permits the network device 110 to join the OpenFlow network 102 and to perform OpenFlow messaging.

If the challenge response is incorrect (316), however, then authentication of the network device 110 is unsuccessful (320). This means that the challenge response within the second authentication response sent by the network device 110 in reply to the second authentication message was not generated correctly. Most likely, improper generation of the second authentication message will be due to the network device 110 not having knowledge of the secret or password, since the network device 110 has already been confirmed as using the same hash algorithm that the network controller 108 does during authentication. The network controller 108 may disconnect the networking connection with the network device 110, as described in part 210 of the method 200. The network controller 108 prohibits the network device 110 from joining the OpenFlow network 102 and from performing OpenFlow messaging.

Furthermore, in response to the network controller 108 sending the second authentication message (312), the controller 108 may not receive a second authentication response in reply back from the network device 110 within a predetermined period of time. If the network controller 108 does not receive the second authentication response (314), then the controller 108 increments a retry counter (322) that is reset to zero at the time the first authentication message is sent in part 306. The network controller 108 will resend the second authentication message to the network device 110 a predetermined number of times until it deems that authentication of the device 110 is unsuccessful. Thus, if the retry counter is not yet greater than this threshold (324), then the second authentication message is resent (312). Once the retry counter has exceeded the threshold, authentication of the network device 110 is unsuccessful (320).

Similarly, if the identifier of the first authentication response received from the network device 110 is different from the identifier of the first authentication message sent in part 306, and/or if the hash algorithm specified within the first authentication response is different from the hash algorithm specified within the first authentication message sent in part 306 (310), authentication is unsuccessful (320). In the latter case, if the network device 110 uses a different hash algorithm to generate the challenge response than the network controller 108 does, even if the network device 110 has knowledge of the secret or password, it will not generate the challenge response correctly. In the former case, if the identifier of the first authentication response is different from the identifier of the first authentication message, then the network device 110 is referencing a different authentication session than the (current) session that network controller 108 is presently preforming.

As noted above, in reply to the first authentication message sent in part 306, the network device 110 may send an error message, such as an OpenFlow error message, or may not send any response whatsoever, instead of sending a first authentication response. Either case can signify that the network device 110 is unequipped to participate in the authentication process. For example, the network device 110, while being an OpenFlow network device that is able to become part of an OpenFlow network and perform OpenFlow messaging, may not have had its internal logic enhanced to participate in OpenFlow authentication as described herein.

Therefore, if in reply to the first authentication message the network controller 108 receives such an error message or fails to receive any response within a predetermined period of time (308), then the network controller 108 decides to permit the network device 110 to nevertheless join the OpenFlow network 102, or not, depending on whether the network controller 108 has been configured for backwards compatibility. If the network controller 108 has been configured to permit backwards compatibility (326), then a network device not having had its logic enhanced to participate in OpenFlow authentication as described herein as nevertheless permitted to join the network 102. As such, the network controller 108 permits the network device 110 to join the OpenFlow network 102 and perform OpenFlow messaging (328). Although the network device 110 has not technically been authenticated, nor has it technically failed authentication, either, in this situation.

By comparison, if the network controller 108 has been configured to prohibit backwards compatibility (326), then just network devices having had their logic enhanced to participate in OpenFlow authentication as described herein are permitted to join the network 102. Therefore, the network controller 108 does not permit the network device 110 to join the OpenFlow network 102 and perform OpenFlow messaging. That is, the network controller 108 has not been successfully authenticated by the network controller 108 (320).

Once the network device 110 has been permitted to join the OpenFlow network 102, the network controller 108 may periodically reauthenticate the device 110 (330). This is achieved by the method 300 being repeated at part 312. If the network device 110 fails any such reauthentication, then the network controller 108 removes the network device 110 from the OpenFlow network 102 in part 320, and can disconnect the networking connection with the device 110.

The techniques described herein thus extend the OpenFlow protocol to provide for authentication therewith. A novel authentication process has been presented herein. This authentication process permits an OpenFlow network controller to authenticate an OpenFlow network device before permitting the network device to join an OpenFlow network and perform OpenFlow messaging.

It is finally noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
    establishing a network connection between an OpenFlow network controller and an OpenFlow network device attempting to become part of an OpenFlow network that the OpenFlow network controller controls; and
    after establishing the networking connection between the OpenFlow network controller and the OpenFlow network device:
        the OpenFlow network controller attempting to authenticate the OpenFlow network device, by:
            sending a first authentication message from the OpenFlow network controller to the OpenFlow network device, the first authentication message specifying a first algorithm; and
            after sending the first authentication message from the OpenFlow network controller to the OpenFlow network device:
                the OpenFlow network controller receiving a first authentication response from the OpenFlow network device sent by the OpenFlow network device in reply to the first authentication message, the first authentication response specifying a second algorithm identical to the first algorithm;
                sending a second authentication message from the OpenFlow network controller to the OpenFlow network device, the second authentication message specifying a challenge value;
                the OpenFlow network controller receiving a second authentication response from the OpenFlow network device sent by the OpenFlow network device in reply to the second authentication message, the second authentication response specifying a correct challenge response; and
                the OpenFlow network controller determining that the authentication of the OpenFlow network device is successful;
        the OpenFlow network controller ignoring OpenFlow messages received from the OpenFlow network device until the OpenFlow network controller has finished attempting to authenticate the OpenFlow network device, and such that the OpenFlow network device is not permitted to become part of the OpenFlow network unless authentication has been successfully completed,
        where the authentication of the OpenFlow network device is successful, the OpenFlow network controller sending a message to the OpenFlow network device to indicate that the authentication was successful and permitting the OpenFlow network device to perform OpenFlow messaging.

2. The method of claim 1, further comprising, after establishing the networking connection:
    where the authentication of the OpenFlow network device is unsuccessful, the OpenFlow network controller prohibiting the OpenFlow network device from performing OpenFlow messaging, and disconnecting the networking connection with the OpenFlow network device.

3. The method of claim 1, wherein attempting to authenticate the OpenFlow network device comprises employing a challenge handshake authentication protocol (CHAP).

4. The method of claim 1, further comprising:
    the OpenFlow network controller periodically reattempting to authenticate the OpenFlow network device, such that any time the OpenFlow network controller fails to authenticate the OpenFlow network device, the OpenFlow network controller prohibits the OpenFlow network device from performing any additional OpenFlow messaging and disconnects the networking connection with the OpenFlow network device.

5. A data storage device storing computer-executable code executable by an OpenFlow network controller to perform a method comprising:
    establishing a network connection between the OpenFlow network controller and an OpenFlow network device attempting to become part of an OpenFlow network that the OpenFlow network controller controls; and
    after establishing the networking connection between the OpenFlow network controller and the OpenFlow network device:
        the OpenFlow network controller attempting to authenticate the OpenFlow network device, by:
            sending a first authentication message from the OpenFlow network controller to the OpenFlow network device, the first authentication message specifying a first algorithm; and
            after sending the first authentication message from the OpenFlow network controller to the OpenFlow network device:
                the OpenFlow network controller receiving a first authentication response from the OpenFlow network device sent by the OpenFlow network device in reply to the first authentication message, the first authentication response specifying a second algorithm identical to the first algorithm;
                sending a second authentication message from the OpenFlow network controller to the OpenFlow network device, the second authentication message specifying a challenge value;
                the OpenFlow network controller receiving a second authentication response from the OpenFlow network device sent by the OpenFlow network device in reply to the second authentication message, the second authentication response specifying a correct challenge response; and
                the OpenFlow network controller determining that the authentication of the OpenFlow network device is successful;
        the OpenFlow network controller ignoring OpenFlow messages received from the OpenFlow network device until the OpenFlow network controller has finished attempting to authenticate the OpenFlow network device, and such that the OpenFlow network device is not permitted to become part of the OpenFlow network unless authentication has been successfully completed; and
        where the authentication of the OpenFlow network device is successful, the OpenFlow network controller sending a message to the OpenFlow network device to indicate that the authentication was successful and permitting the OpenFlow network device to perform OpenFlow messaging.

6. An OpenFlow network controller comprising OpenFlow authentication logic and hardware, the hardware including at least a processing mechanism, the OpenFlow authentication logic being implemented at least by the hardware to perform a method comprising:
    establishing a network connection between the OpenFlow network controller and an OpenFlow network device attempting to become part of an OpenFlow network that the OpenFlow network controller controls; and
    after establishing the networking connection between the OpenFlow network controller and the OpenFlow network device:

the OpenFlow network controller attempting to authenticate the OpenFlow network device, by:
sending a first authentication message from the OpenFlow network controller to the OpenFlow network device, the first authentication message specifying a first algorithm; and
after sending the first authentication message from the OpenFlow network controller to the OpenFlow network device:
the OpenFlow network controller receiving a first authentication response from the OpenFlow network device sent by the OpenFlow network device in reply to the first authentication message, the first authentication response specifying a second algorithm identical to the first algorithm;
sending a second authentication message from the OpenFlow network controller to the OpenFlow network device, the second authentication message specifying a challenge value;
the OpenFlow network controller receiving a second authentication response from the OpenFlow network device sent by the OpenFlow network device in reply to the second authentication message, the second authentication response specifying a correct challenge response; and
the OpenFlow network controller determining that the authentication of the OpenFlow network device is successful;
the OpenFlow network controller ignoring OpenFlow messages received from the OpenFlow network device until the OpenFlow network controller has finished attempting to authenticate the OpenFlow network device, and such that the OpenFlow network device is not permitted to become part of the OpenFlow network unless authentication has been successfully completed; and
where the authentication of the OpenFlow network device is successful, the OpenFlow network controller sending a message to the OpenFlow network device to indicate that the authentication was successful and permitting the OpenFlow network device to perform OpenFlow messaging.

* * * * *